United States Patent
Cowles et al.

[11] 3,768,780
[45] Oct. 30, 1973

[54] FENCE BORDER

[76] Inventors: Tommie Cowles, 1075 Welsh View Dr., Newark; Clarence McKittrick, 5424 Winchester Southern Rd., Canal Winchester, both of Ohio

[22] Filed: Jan. 26, 1972

[21] Appl. No.: 220,732

[52] U.S. Cl. .................................. 256/1, 256/32
[51] Int. Cl. ............................................ E04h 17/06
[58] Field of Search .................. 256/1, 19, 32, 34; 52/102; 47/33

[56] References Cited
UNITED STATES PATENTS

| | | | |
|---|---|---|---|
| 3,384,351 | 5/1968 | Turner | 256/32 |
| 2,713,751 | 7/1955 | Hendrixson | 47/32 |
| 3,277,606 | 10/1966 | Cohen | 47/33 |
| 3,545,127 | 12/1970 | Jensen | 256/32 |
| 3,676,952 | 7/1972 | Watts | 47/33 |

*Primary Examiner*—Dennis L. Taylor
*Attorney*—Tommie M. Cowles

[57] ABSTRACT

A construction for bordering a lower edge of a fence, so to eliminate the need of trimming grass under a fence or passage of animals under the fence, the construction comprising a one piece continuous plastic or rubber device that fits between the bottom edge of the fence and the grass or ground, the device consisting of a pair of side by side panels interconnected by a spreadable accordeon pleat element so that the panels can be spread apart, and so that the lower edge of the fence can be force fitted between the upper portions of the panels, thus securing the border in utility position.

1 Claim, 3 Drawing Figures

Patented Oct. 30, 1973 3,768,780
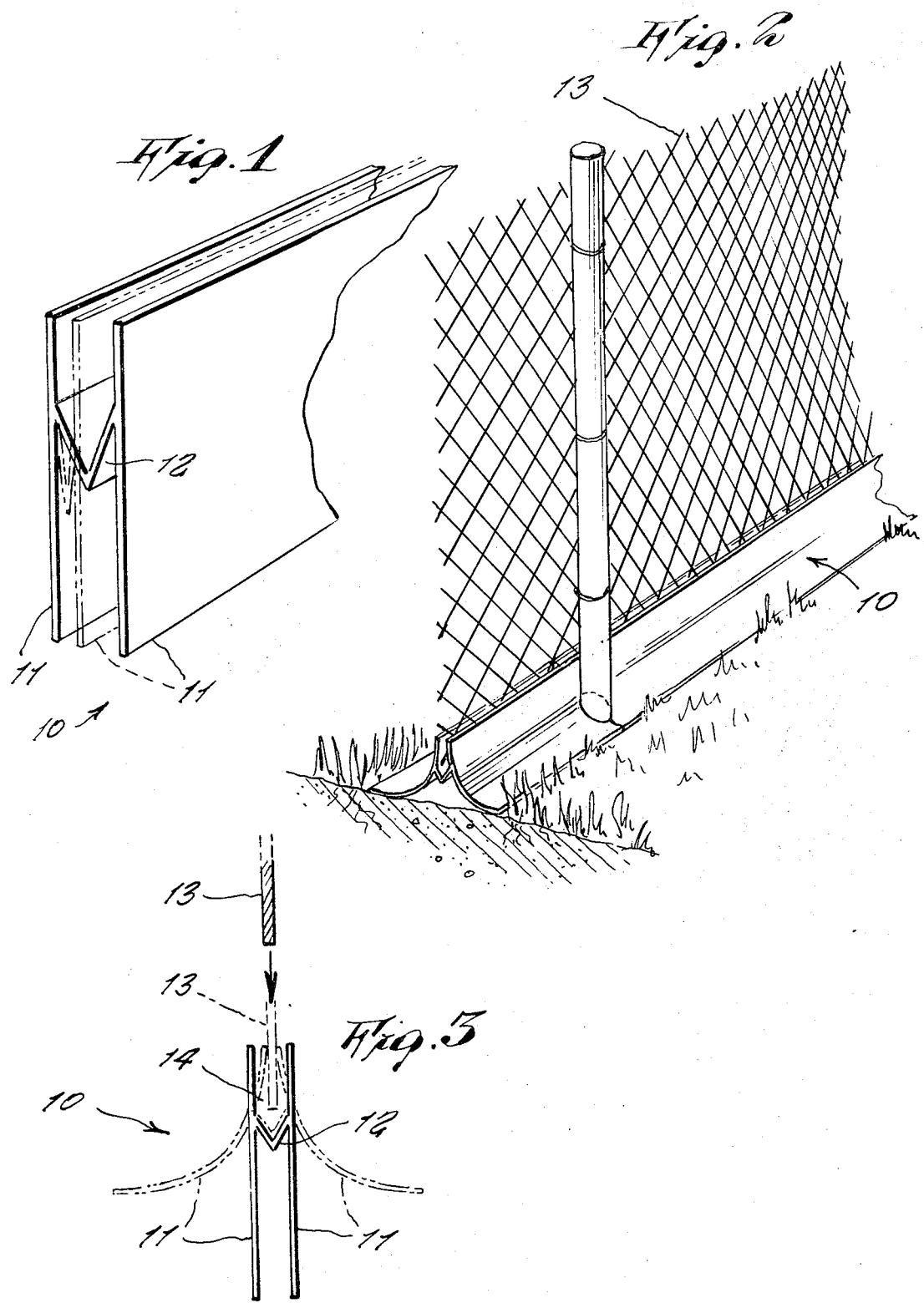

FENCE BORDER

This invention relates generally to fence accessories. More specifically it relates to fence trim.

It is generally well known to most home owners that the growth of grass beneath a fence necessitates the laborous and time-consuming task of trimming by hand if a neat lawn manicure is desired. This situation is, of course, objectionable and therefore in want of improvement.

Accordingly, it is a principal object of the present invention to provide a border for placement under a fence for eliminating the necessity of trimming grass under a fence.

Another object is to provide a border which gives a neat and finished appearance to a fence.

Yet another object is to provide a border which prevents passage of rodents or other animals under a fence.

Yet a further object is to provide a fence border which eliminates the use of dangerous barbed wire under a fence so to retard animals from passage under the fence.

Yet a further object is to provide a fence border which prevents the growth of grass within several inches of the fence, so that the lawn can be cut by a lawn mower without need of getting too close to the fence, thus allowing the chore to be done quickly and attractively.

Other objects are to provide a fence border which is simple in design, inexpensive to manufacture, rugged in construction, easy to use, and efficient in operation.

These and other objects will be readily apparent upon a study of the following specification and the accompanying drawing, wherein:

FIG. 1 is an end perspective view of the invention shown by phantom lines in a collapsed position, and shown by solid lines in an extended position.

FIG. 2 is a perspective view thereof shown installed under a fence.

FIG. 3 is an enlarged end view of the invention shown compared in relaxed and flexed positions.

Referring now to the drawing in detail, the reference numeral 10 represents a fence border according to the present invention, wherein there is a one piece unit made of flexible material such as plastic or rubber, and which is made by molding operation; the device consisting of elongated flat panels 11 in parallel side by side position and which are interconnected by spreadable accordion pleat 12 of cross-sectional V-shape integrally molded together. The panels may be of any practical length and height. The pleat is enjoined to the panels at approximately one and one-half inches from the top edge of each panel, the pleat being continuous and of a same length as the panels or alternately comprised of small intermittent sections. The cross-sectional dimension of the pleat is such that the panels can be spread apart approximately three-quarter of an inch. The unit may be made in any color such as green, brown, or the like.

In use, as shown in FIG. 3, the border 10 is inserted on the bottom end of a fence 13 (which may be of any type such as wood, woven wire or the like), by spreading apart the panels to form the fence receiving pocket 14 above the pleat. The lower part of the border is then spread out as shown by dotted lines in FIG. 3 so to bear against the top of the ground, thus clamping the upper part with pressure against the fence sides. The spread out lower part of the border prevents growth of grass close to the fence so that mowing is made easier. The force against the ground surface prevents animals from lifting the device so they cannot pass under the fence.

While various changes may be made in the detail construction, it is understood that such changes will be within the spirit and scope of the present invention as is defined by the appended claims.

I claim:

1. In a fence border, the combination of a pair of panels in spaced side by side relation, and interconnecting means between said panels, so to form a unit insertable under a bottom edge of a fence to form a barrier against animal passage under said fence, and prevent grass growth therebeneath, said means comprising a V-shaped, spreadable accordion pleat, said panels and pleat being integrally formed together and made of flexible material such as resilient plastic or rubber, said pleat being enjoined to said panels along transverse intermediate portions of each said panel so that said intermediate portion serves as a fulcrum about which each side panel pivots whereby when the lower portions of said panels, below said intermediate portions, are spread apart, the upper portions, above said intermediate portions, are urged toward each other, so that when said fence border is installed under said fence with the fence bottom edge being fitted in a space between the upper portions of said panels, and the lower portions of said panels being sidewardly flexed apart and rested on a ground surface, said panels pivoting about said accordian pleat so that said upper portions of the panels are urged toward each other so to bear against opposite sides of said fence for a tight fit.

* * * * *